United States Patent [19]

Long et al.

[11] Patent Number: 4,632,488
[45] Date of Patent: Dec. 30, 1986

[54] CORD STRAIN RELIEF DEVICE

[75] Inventors: Eric L. Long, Northbrook; Keith A. Rosborough, Lagrange, both of Ill.

[73] Assignee: Switchcraft, Inc., Chicago, Ill.

[21] Appl. No.: 618,710

[22] Filed: Jun. 8, 1984

[51] Int. Cl.$^4$ .................... H01R 13/56; H01R 13/58
[52] U.S. Cl. .................................. 339/103 R; 339/101
[58] Field of Search ............................... 339/101, 103

[56] References Cited

U.S. PATENT DOCUMENTS

| 1,858,816 | 9/1929 | Burkhardt . |
| 2,724,736 | 2/1953 | Klumpp, Jr. . |
| 3,032,737 | 5/1962 | Rottmann . |
| 3,054,848 | 4/1958 | Reesby et al. . |
| 3,395,244 | 3/1967 | Koehler . |
| 3,865,461 | 2/1975 | Ludwig . |
| 4,056,252 | 11/1977 | Simon . |

FOREIGN PATENT DOCUMENTS

| 2237326 | 2/1974 | Fed. Rep. of Germany ... 339/103 R |
| 2076232 | 4/1981 | United Kingdom . |

Primary Examiner—Eugene F. Desmond
Attorney, Agent, or Firm—John T. Meaney; R. M. Sharkansky

[57] ABSTRACT

An electrical connector having strain relief and integral means for clamping and manually unclamping an electrical cord. The connector includes a housing having a compartment, disposed within a forward portion of the housing, for receiving an electrical device. An array of ratchet teeth is disposed rearward of the forward portion and is disposed circumferentially about an inner wall portion of the compartment. An inner wall portion of the housing disposed between the array of ratchet teeth and a rear entrance aperture of the housing has formed therein a circumferential groove. A member inserted into the housing has a cord clamping component integrally connected to a strain relief component through a bushing component. The bushing component has a pawl engageable with the array of ratchet teeth to provide a ratchet. The cord clamping component has a distal end rotatably fixed relative to the housing adjacent the compartment; a proximal end connected to the bushing and rotatably disposed within the groove; and, a helical spring-like element disposed between the distal end and the proximal end for providing radially compressive forces to portions of an electrical cord passing therethrough, such cord being electrically connected to the electrical device, passing through the bushing, and exiting the electrical connector while passing through the strain relief component. The bushing includes means for manually releasing the cord clamping component.

9 Claims, 26 Drawing Figures

CORD STRAIN RELIEF DEVICE

BACKGROUND OF THE INVENTION

1. Field of the Invention

This invention relates generally to strain relief devices and is concerned more particularly with an electrical cord strain relief member having integral means for clamping and unclamping the electrical cord.

2. Discussion of the Prior Art

In connecting an electrical cord to a housing of an electrical device, such as an appliance, for example, the electrical cord may be passed axially through a sleeve-like strain relief member and through a bushing in a first opening in said housing. The bushing usually is made of dielectric material, such as rubber, for example, which protects the electrical cord from abrasion or cutting on the edges of said first opening. The sleeve-like strain relief member, such as a helical spring, for example, is designed to resist any tendency of the electrical cord to bend sharply adjacent the bushing where mechanical fatigue may occur and cause the wires in the electrical cord to break.

The electrical cord then may be passed through the housing and out a second opening for connection to an insert subassembly, such as a switch unit, for example, which may be installed in the second opening. Consequently, after wires in the electrical cord have their portions stripped and connected to electrical terminals of the insert sub-assembly, the electrical cord may be pulled back through the bushing in said first opening and through the strain relief member so that the insert sub-assembly may be installed in said second opening of the housing.

In order to ensure that any further pulling of the electrical cord will not tear the wires thereof from the connected terminals, there may be provided within the housing a cord clamping means which is rigidly supported. Thus, an anchoring portion of the electrical cord, such as a bare ground wire, for example, is firmly secured to the clamping means within the housing in a manner for absorbing any pulling forces exerted on the electrical cord so that only minimal effects thereof are transmitted to the wires connected to the electrical terminals.

In disconnecting the electrical cord from the electrical device, the insert sub-assembly may be removed from said second opening in the housing and the wires of the electrical cord disconnected from the terminals of the sub-assembly. In practice, the stripped end portions of the wires may be provided with sleeve-type terminal members which slidingly engage terminals of the sub-assembly. Thus, the wires of the electrical cord may be readily disconnected from the terminals of the sub-assembly by simply sliding the terminal end portions thereof off the terminals of the sub-assembly.

However, in order to disconnect the electrical cord from the electrical device, it also is necessary to remove the anchoring portion of the electrical cord from the clamping means within the housing; and this may not be accomplished as readily as disconnecting the wires of the cord from the terminals of the sub-assembly. Also, additional tools may be required for disconnecting the anchoring portion of the cord from the clamping means within the housing. For example, the anchoring portion of the cord may be firmly secured to the clamping means by soldering or crimping techniques. Thus, disconnecting the cord from the electrical device may require unsoldering or cutting the anchoring portion in order to release the electrical cord.

SUMMARY OF THE INVENTION

Accordingly, these and other disadvantages of the prior art are overcome by this invention providing a cord strain relief device having integral means for clamping an electrical cord and also having integral means for unclamping the electrical cord in a manner which does not require the use of a tool. This novel strain relief device may be embodied in a single sleeve-like member having a unified structure made of resilient dielectric material, such as a moldable plastic material, for example. The sleeve-like member is comprised of an end portion constituting a cord clamping component which is integrally joined through an intermediate body portion constituting a bushing component to the other end portion of the sleeve-like member constituting a cord strain relief component.

The cord clamping component is axially insertable through a first opening in a housing of a connecting electrical device; and, the adjacent end portion of the bushing component is provided with mounting means for securing said adjacent end portion in said first opening as desired, such as rotatably, for example. Thus, the remaining length of the bushing component and the integrally joined cord strain relief component extend outwardly of the housing for receiving an electrical cord which is passed axially through the sleeve-like member and into the housing. The bushing component is provided with the cord unclamping means which extends outwardly of the housing with the bushing component for digital operation by a user.

The cord clamping component comprises a helical spring-like element having a proximal end integrally joined to said adjacent end portion of the bushing component mounted in the first opening of said housing. The helical spring-like element has a plurality of helical turns wound resiliently about its axial centerline and extending away from the bushing component. At its distal end portion, the helical spring-like element terminates in a ring provided with anti-rotation means, such as a diametrically opposed pair of radially extended ears which may be engaged in respective slots in said housing, for example. Thus, the anti-rotation means holds the ring at the distal end portion of the helical spring-like element to the housing when the external portion of the bushing component is rotated with respect to the housing digitally by a user. As a result, the helical turns of the spring-like element wind tightly around the encircled portion of the electrical cord to clamp it against axial movement by a pulling force exerted on the cord. The tightly wound spring-like element is clamped into position by a pair of opposing ratchet pawls integrally formed with the bushing component engaging to ratched teeth provided within the housing.

The unclamping means comprises a diametrically opposed pair of resilient tangs which extend longitudinally of the bushing component and have respective proximal end portions integrally joined to a midportion thereof. The resilient tangs have respective distal end portions terminating at said adjacent end portions of the bushing mounted rotatably in said first opening of the housing. The distal end portions of the tangs carry the respective opposing pair of ratchet pawls into engagement with the ratchet teeth disposed in an arcuate array within the housing and adjacent said first opening in the housing. While, as noted above, the pawls engaging the ratchet teeth fix the rotated bushing component and thereby prevent rotation of the helical spring-like element in the opposing or unwinding direction. However, when the tangs are pressed radially by the thumb and index finger of a user, the pawls are disengaged from the ratchet teeth and permit the user, aided by the resiliency in the wound turns of the helical spring-like element, to rotate the bushing component in the opposing or unwinding direction. As a result, the helical turns of the spring-like element loosen around the encircled portion of the electrical cord and permit it to be withdrawn axially from the strain relief device and from the housing of the connecting electrical device.

BRIEF DESCRIPTION OF THE DRAWINGS

For a better understanding of this invention, reference is made in the following detailed description to the accompanying drawings wherein.

DESCRIPTION OF THE PREFERRED EMBODIMENT

Figures 1, 1A, 1B, 2, 3:
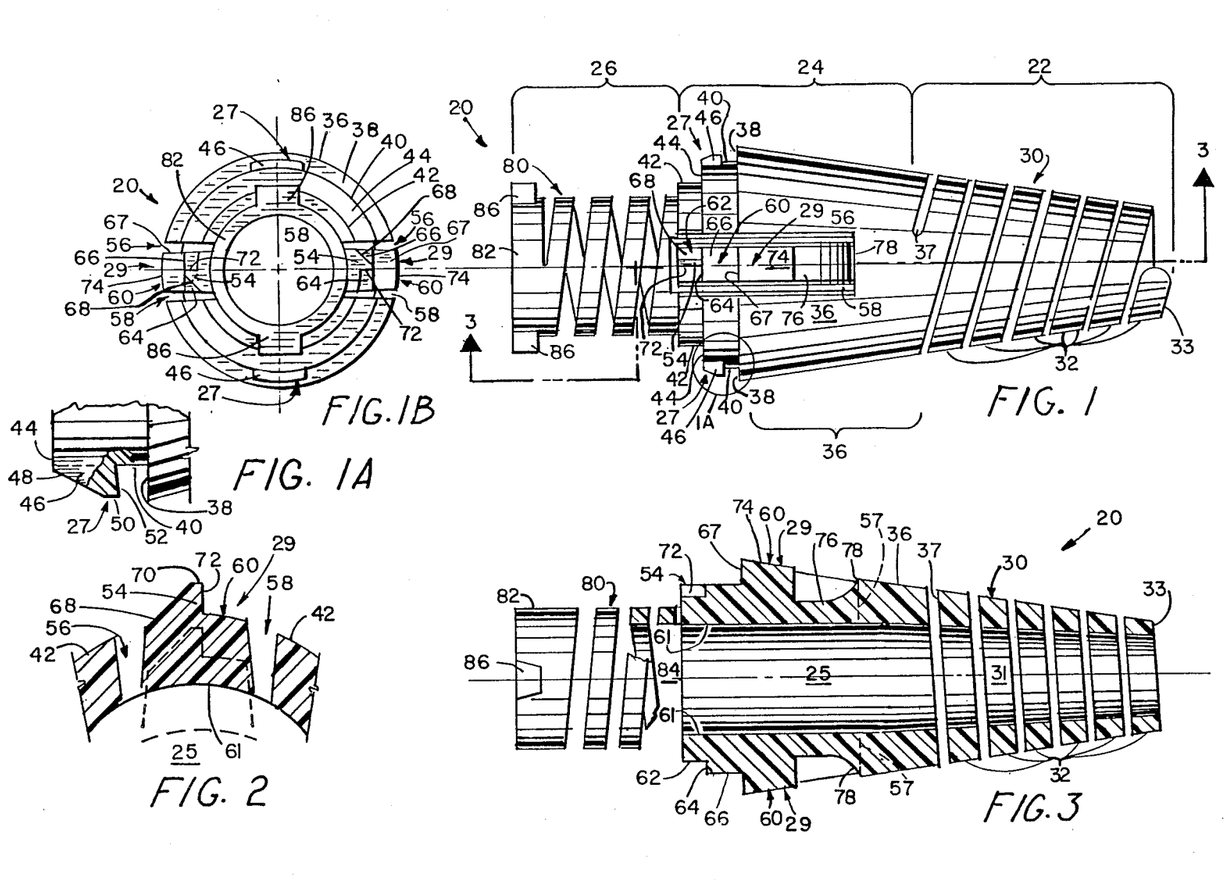
FIG. 1 is an elevational view of a cord strain relief device embodying the invention.
FIG. 1A is an enlarged fragmentary view, partly in section, of the mounting lip on the cord strain relief device shown in FIG. 1.
FIG. 1B is an end view of the cord strain relief device shown in FIG. 1.
FIG. 2 is an enlarged cross-sectional view of one of the pawls shown in FIG. 1 (such pawl when in a depressed condition being shown in phantom)
FIG. 3 is an axial sectional view taken along the line 3—3 shown in FIG. 1 and looking in the direction of the arrows.

Referring to the drawings wherein like characters of reference designate like parts throughout the several views, there is shown in FIGS. 1-3 a cord strain relief device 20 for an electrical connector 21 (FIG. 11B) comprising a single sleeve-like member having a unitary tubular structure made of suitable dielectric material, such as moldable plastic material, for example. Device 20 has an end portion comprising a strain relief component 22 which is integrally joined through an intermediate body portion comprising a bushing component 24 to an opposing end portion comprising an electrical cord-clamping component 26. The bushing component 24 has an inner surface defining an axial bore 25 of substantially uniform diameter. Also, the bushing component 24 is provided with integral fastening means 27 and with integral cord-unclamping means 29 which will be described hereinafter in greater detail.

Figures 9, 9A, 10, 11A, 11B, 11C:
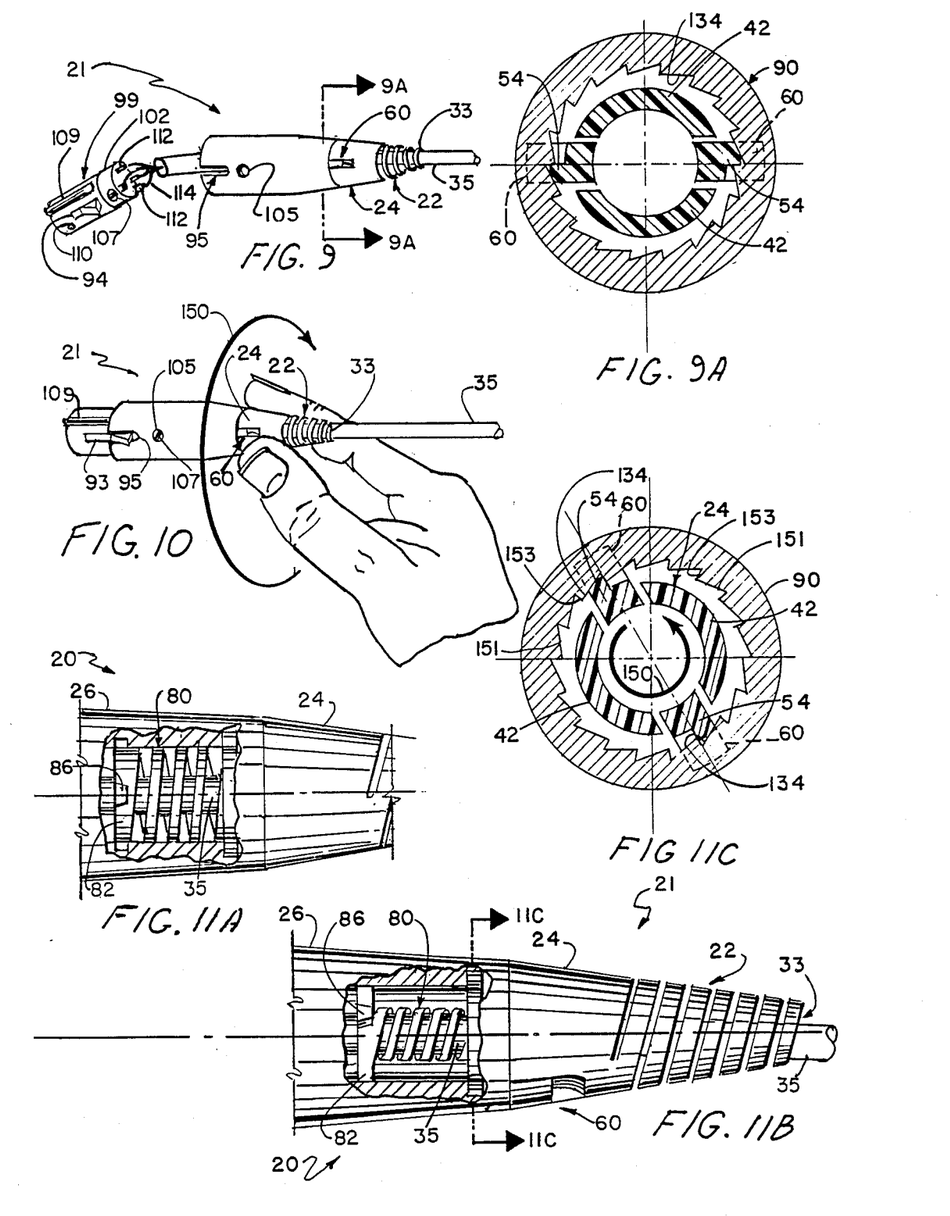
FIG. 9 is a schematic view of the housing and strain relief device assembly shown in FIG. 5 but having an electrical cord inserted through it for connection to an insert sub-assembly.
FIG. 9A is a transverse sectional view taken along line 9A—9A shown in FIG. 9 and looking into the direction of the arrows.
FIG. 10 is a schematic view of an electrical connector having the housing and strain relief device assembly shown in FIG. 9 but having the insert sub-assembly installed and the strain relief device operated for clamping the cord.
FIG. 11A is an elevational view, partly is axial section, of a portion of the housing and strain relief device assembly shown in FIG. 5 but fully assembled for clamping the electrical cord shown in FIGS. 9 and 10 but prior to clamping the electrical cord.
FIG. 11B is an elevational view partially in axial section of an electrical connector having the housing and strain relief device assembly shown in FIG. 5 fully assembled and clamping the electrical cord shown in FIGS. 9 and 10.
FIG. 11C is a transverse sectional view taken along line 11C—11C shown in FIG. 11B and looking into the direction of the arrows.

Cord strain relief component 22 comprises a spring-like element having a resiliently coiled structure 30 formed of a plurality of helical turns 32 which are arranged in axial overlaying relationship from the distal end 33 to the proximal end 37 of the component 22. The turns 32 may be provided with respective inner diameters which are substantially similar to one another and to the diameter of axial bore 25. Thus, when the coiled structure 30 is in a relaxed state where the turns 32 are axially aligned with the bore 25, the inner surface of turns 32 may form a bore 35 which constitutes substantially an extension of the axial bore 25 in bushing component 24. Alternatively, the turns 32 may have respective inner diameters which decrease gradually in magnitude as a function of axial distance from the proximal end 37 of cord strain relief component 22. Accordingly, the inner surfaces of turns 32 may define a bore 35 having wall surfaces which taper radially inward of the coiled structure 30 from the proximal end 37 to the distal end 33 of component 22. Thus, there will be provided at the distal end 33 of component 22 a resilient snug fit for an electrical cord 35, such as shown in FIG. 9, for example, inserted axially into the distal end 33 portion of component 22.

The helical turns 32 of coiled structure 30 may have respective radial thicknesses which increase gradually with axial distance from the distal end 33 of component 22 towards the proximal end 37. Consequently, successive turns 32 from the distal end 33 of component 22 will offer increasingly greater resilient resistance to being drawn or pulled out of axial alignment with the bore 25 in bushing component 24. Thus, the coiled structure 30 provides strain relief means for counteracting tendencies of an axially disposed electrical cord 35, such as shown in FIGS. 9 and 10, for example, to bend sharply adjacent the bushing component 24. Due to the helical turns 34 having increasing radial thicknesses in accordance with axial distance from the distal end 33 of component 22, the coiled structure 30 is provided with an external frustoconical configuration having its larger diameter end integrally joined to a similar sized end of the bushing component 24.

The tubular wall forming bushing component 24 has a length portion 36 which has a radial thickness increasing gradually from the end of component 24 joined to component 22 to adjacent an opposing stepped end portion of component 24 joined to component 26. Thus, the length portion 36 comprises most of the length of component 24 and, due to its increasing radial thickness, has an external frusto-conical configuration, which may be similar to the external frusto-conical configuration of coiled structure 30 and constitutes an axial extension thereof. The gradual increase in radial thickness of the tubular wall forming frusto-conical length portion 36 provides the bushing component 24 with the structural length and rigidity necessary for supporting the device 20 in a desired mounted position, even when an electrical cord 35 is inserted axially into the device 20, as shown in FIG. 10, for example.

Accordingly, the frusto-conical length portion 36 of component 24 has an external surface which tapers outwardly of component 24 from the smaller diameter end of portion 36 joined to coil structure 30 to the opposing larger diameter end adjacent a stepped end portion of component 24 joined to the component 26. The larger diameter end of frusto-conical length portion 36 is integrally joined to a reduced diameter, stepped portion 40 of component 24, and forms at the juncture an annular shoulder 38 which extends radially outward from the external surface of stepped portion 40. Thus, the radial dimension of annular shoulder 38 determines the radial distance the external surface of stepped portion 40 is located inwardly of the external surface of portion 36 adjacent its larger diameter end, and the correspondingly decreased radial thickness of stepped portion 38 as compared to the radial thickness of portion 30 adjacent its larger diameter end.

The stepped portion 40 extends axially of component 25 and is integrally joined to a stepped end portion 42 having a further reduced diameter. Consequently, the stepped portion 40 forms at the juncture an annular shoulder 44 which extends radially outward from the external surface of stepped end portion 42. Thus, the radial dimension of annular shoulder 44 determines the radial distance the external surface of stepped portion 42 is located inwardly of the external surface of stepped portion 40, and the correspondingly decreased radial thickness of stepped portion 42 as compared to the radial thickness of stepped portion 40. The stepped end portion 40 of component 24 extends axially thereof and terminates at the end of component 24 integrally joined to cord-clamping component 26.

Projecting outwardly of the external surface of stepped portion 40 is a diametrically opposed pair of fastening bosses 46 which comprise the previously mentioned fastening means 27 provided with the bushing component 24. As shown in FIG. 1B, the bosses 46 have respective arcuate curvatures conforming to the curvatures of stepped portions 40 and 42, respectively, which are substantially concentric with one another and with the frusto-conical length portion 36. As shown clearly in FIG. 1A, each of the bosses 46 increases gradually in radial extension from the external surface of stepped portion 40 as a function of axial extension along said external surface from the shoulder 44. As a result, each of the bosses 46 has a beveled leading surface 48 which slopes axially from the shoulder 44 and extends radially outward from the external surface of stepped portion 40 to terminate adjacent a blunt-typed rim portion 50 of the respective boss 46. Also, each of the bosses 46 has a respective trailing surface 52 which is disposed at a rake angle with respect to a plane extending perpendicular to the axial centerline of bore 25. The rake-angled trailing surface 52 of the respective bosses 46 provide means for the bosses 46 to flex so that the rim portions 50 of the bosses 46 may pass through a suitable undersized aperture (not shown) and then spring outward to their normal radial extent for fastening the device 20 in a desired mounted position.

Also, projecting outwardly of the external surface of stepped portion 42 (FIG. 1) is a diametrically opposed pair of pawls 54, each of which is carried on a distal end portion 62 of a respective one of a pair of opposing resilient tangs 60. The tangs 60 constitute the previously mentioned cord-unclamping means 29 provided with the bushing component 24. As shown more clearly in FIGS. 1 and 1B, each of the resilient tangs 60 is disposed axially between a respective pair of slots 56 and 58 which extend radially through the tubular wall forming bushing component 24 and communicate with the bore 25. Furthermore, the respective pairs of slots 56 and 58 extend axially from the end of component 24 joined to component 26 well into the frusto-conical length portion 36. The respective pairs of slots 56 and 58 terminate in the frustoconical length portion 36 where the interposed tangs 60 have respective proximal end portions 78 integrally joined to the material of portion 36 along a plane approximately coinciding with the inner closed end of slots 56, 58 denoted by the dashed line 57.

Each of the tangs 60 has along its entire length a respective inner surface 61 (FIG. 3) which is curved arcuately about the axial centerline of bore 25 and conforms substantially to the curvature of the inner surface of component 24 defining the axial bore 25. Thus, from within the bore 25, the resilient tangs 60 have the appearance of respective axially cut sections in the tubular wall forming the bushing component 24. Also, each of the resilient tangs 60 has its distal end portion 62 provided with an axial length substantially equal to the axial length of stepped end portion 42, and provided with a radial thickness substantially equal to the radial thickness of stepped end portion 42. Furthermore, the distal end portion 62 of tangs 60 have respective external surfaces which are curved arcuately in conformity with the curvature of the external surface of stepped end portion 42. Thus, the distal end portions 62 may be considered as respective arcuate portions of the stepped end portion 42, but are separated therefrom by the respective pair of slots 56 and 58.

The distal end portions 62 of the tangs 60 are integrally joined to respective stepped portions 66 thereof which form respective radial shoulders 64 at the junctures. Stepped portions 66 have respective axial lengths substantially equal to the axial length of stepped portion 40, and have respective radial thicknesses which are substantially equal to the radial thickness of stepped portion 40.

The pawls 54 extend axially from ends of the respective distal end portions 62 adjacent the component 26 a predetermined distance which may be substantially equal to the entire axial lengths of the respective portions 62. Also, the pawls 54 extend radially outward from the external surfaces of the respective distal end portions 62 a predetermined distance which may be substantially equal to the dimensions of the respective shoulders 64 terminating the stepped portions 66. Accordingly, the pawls 54 may have their ends adjacent the respective shoulders 64 integrally joined thereto, and may be considered as axial extensions of the respective stepped portions 66 as well as radial extensions of the respective distal end portion 62.

Each of the pawls 54 may be provided with a respective sawtooth configuration in the direction of the external surface of the respective distal end portion 62 from the longitudinal side thereof adjacent slot 56. Thus, each of the pawls 54 may have a radial thickness which increases gradually from the longitudinal side of the respective distal end portion 62 adjacent slot 56 to approximately the axial midportion of the external surface of said distal end portion 62. As a result, each of the pawls 54 includes a beveled leading surface 68 (FIG. 2) which shapes radially outward from the longitudinal side of the respective distal end portion 62 adjacent slot 56 and terminates at its extreme radial extent in a blunt-tip surface 70 of the pawl. The blunt-tip surface 70 may be located approximately in axial alignment with the external surface of stepped portion 66. Also, each of the pawls 54 may be provided with a trailing surface 72 which extends radially inward from the blunt-tip surface 70 to the external surface of the respective distal end portion 62 and may be located approximately in a plane passing through the axial centerline of said external surface.

The stepped portions 68 of tangs 60 are integrally joined to respective knob portions 74 thereof which may have greater axial lengths and which form respective radial shoulders 78 at the junctures with stepped portions 66. The radial shoulders 76 are provided with substantially the same radial extensions than the radial extension of shoulder 38; and the knob portions 74 are provided with substantially the same radial thicknesses as the radial thickness of frusto-conical portion 36 adjacent either of the longitudinal sides of the respective knob portions 74.

Each of the knob portions 74 is integrally joined to a respective radially thin portion 76 which provides means for the tangs 60 to flex or bend so that the distal end portions 62 of the respective tangs 60 moves radially of the component 24 is shown in phantom in FIG. 3. The radially thin portions 76 have respective radially thicknesses which are considerably less than the radial thicknesses of the adjoining knob portions 74 and substantially less than the radial thickness of the frusto-conical portion 36 adjacent either longitudinal side of the respective portions 76. Consequently, the radially thin portions 76 have respective external surfaces which are recessed radially inward of the external surface of frusto-conical portion 36 adjacent either of the longitudinal sides of the respective portions 76.

The electrical cord clamping component 26 is integrally formed with bushing 24 and strain relief component 22 and includes a helical spring-like element 80 having a proximal end integrally joined to the adjacent end portion of bushing component 24. The distal end of spring-like element 80 terminates in a ring 82. It is noted that the spring-like element 80 has a plurality of helical turns wound resiliently about its axial centerline and extending away from the bushing component 24. Thus, the helical turns circumscribe a bore 84 disposed co-axially with bore 24 and bore 35. The bore 84 has a diameter substantially equal to the diameter of axial bore 25 when the helix is in a relaxed condition, as shown in FIGS. 1, 1A and 3A. The ring 82 is annular and has an inner diameter substantially equal to the diameter of the axial bore 25. The ring 82 is provided with anti-rotation means, here a diametrically opposed pair of radially extended ears 86. The ears 86 are disposed in ninety degree relationship with respect to the tangs 60 as shown in FIG. 1B and are aligned with fastening bosses 46, as shown in FIG. 1B.

Figures 4, 4A, 4B, 5, 5A, 5B, 5C:
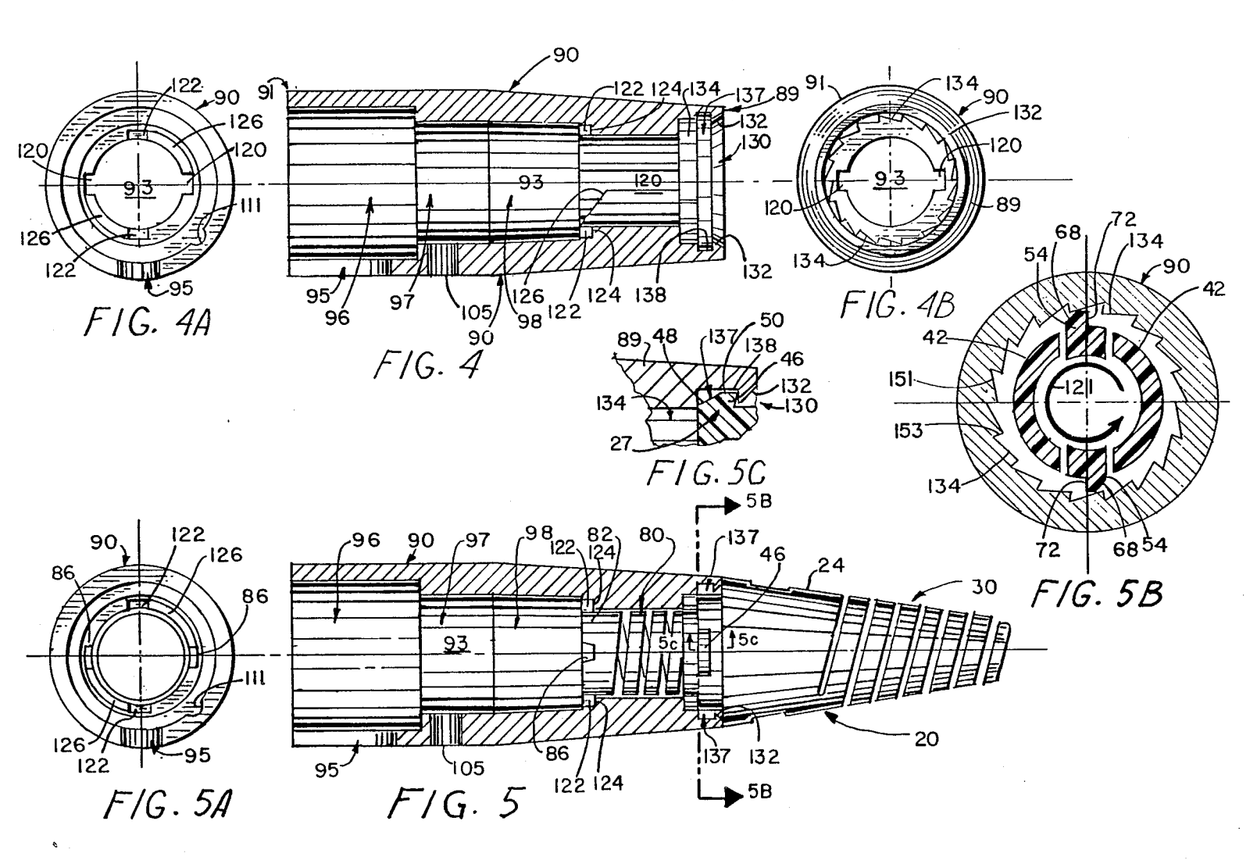
FIG. 4 is an axial sectional view of the housing designed for receiving the cord strain relief device shown in FIGS. 1-3.
FIG. 4A is an end view of the housing shown in FIG. 4.
FIG. 4B is an opposing end view of the housing shown in FIG. 4.
FIG. 5 is an elevational view, partly in axial section, of an assembly embodying the cord strain relief device shown in FIGS. 1-3 initially installed in the housing shown in FIG. 4.
FIG. 5A is an end view of the assembly shown in FIG. 5.
FIG. 5B is a transverse sectional view taken along line 5B—5B shown in FIG. 5 and looking in the direction of the arrows.
FIG. 5C is a cross-sectional view taken along line 5C—5C of FIG. 5 of the mounting lip of FIG. 1A engaged and locked into a slot formed in the housing.

Referring now to FIGS. 4, 4A and 4B, a metal cylindrical housing 90 (here die cast zinc) has an axial bore 93 passing therethrough. While the left (or forward) end 91 of housing 90 has a substantially constant outer diameter, outer diameter of the right end 95 (or rearward) portion of housing 90 is tapered down and terminates with a diameter substantially equal to the largest diameter of the bushing 24 (i.e., the outer diameter of shoulder 38, FIG. 1). The cylindrical housing 90 has formed within it three compartments 96, 97, 98, as shown. Compartment 96 is disposed in the forward portion 91 of the housing 90 and has the largest diameter of the three compartments 96, 97, 98. The diameter of such compartment 96 is substantially constant and is designed to receive the connector insert 99 shown in FIG. 9. Here, the connector insert 99 is a female insert model QG3F manufactured by Switchcraft, Inc., Chicago, Ill. It is noted that the portion of housing 90 wherein compartment 96 is formed is provided with a slot 95 for receiving the release mechanism 93 or standard latch-lock mechanism of the connector insert 99. The compartment 97 has a diameter less than the diameter of compartment 96 and is designed to receive the rearward portion 102 of the connector insert 99 shown in FIG. 9. It is noted that a portion of the wall forming compartment 97 is formed with a hole 105 which passes through such wall as shown in FIG. 4. As is known the connector insert 99 is provided with a machine screw 107 initially threaded within the connector insert 99. In this condition, the connector insert 99 is allowed to slip into compartments 96, 97. The connector insert 99 is polarized with a polarization rib 109 which engages a polarization slot 111 formed in a portion of the inner wall of compartment 96. The surface of the machine screw 107 is larger than the diameter of the hole 105 and, thus, after insertion of the connector insert 99 into compartments 96, 97, a screw driver placed through the hole 105 is used to back off the screw 102 (or i.e., tend to remove the screw away from the connector insert 99) so that the outer surface of the head of the screw 102 engages the portions of the inner walls of compartment 77 adjacent to hole 105 thereby tightening the connector insert 99 within the compartment 97 in a well known manner. Spring-loaded balls 110 formed into the connector insert 99 become released and engage the walls of compartment 96 while providing a good electrical ground in a well known manner. Compartment 98 is used to receive the electrical terminals 112 portions of the connector insert 99 to which the conductors 114 of the electrical cord 35 (FIG. 9) are electrically connected. It is noted that compartment 98 tapers slightly from the forward section to the rearward section. Adjacent compartment 98 and extending towards the rearward section of the housing 90 the inner walls of the housing 90 are provided with a pair of receiving slots 120 which pass from compartment 98 and terminate for access by the aperture provided in the rearward end 95 of the housing 90, as shown in FIGS. 4A and 4B. Disposed orthogonal to these receiving slots 102 is a pair of locking slots 122. It is noted that from FIGS. 4 and 4A that the locking slots 122 do not pass from compartment 98 for access by the rear aperture provided in the rearward end 95 of the housing 90 but rather extend from compartment 98 and terminate with a locking wall 124 formed in the housing 90. Also formed within housing 90 is a pair of forwardly sloped camming ramps 126 each one extending from one of the receiving slots 120 to an adjacent locking slot 122, as shown in FIG. 4A. The rearward section of housing 90 is comprised of three sections: The first section is the entrance aperture 130 defined by an inwardly tapered wall 132; A section comprising a circumferential arcuate array of die cast ratchet teeth 134 shown in FIG. 4B; and a machined annular section 137 defined by a wall 138 of substantially constant diameter disposed between the array of ratchet teeth 134 and the entrance aperture 130, the diameter of the wall 138 of annular section 137 being greater than the diameter of the portion of the tapered entrance aperture 130 adjacent such constant diameter annular section 137 to form a machined slot circumferentially around the inner wall of the housing 90. That is, the entrance aperture 130 has a tapered wall 132 formed around the inner wall of housing 90. Wall 132 has a larger diameter at the rearward end 130 and a smaller diameter at the annular slotted section 137. The diameter of wall 138 is larger than the smaller diameter of wall 132 thereby allowing section 137 to form the slot, as shown in FIG. 5C.

Figures 6, 6A, 7, 7A:
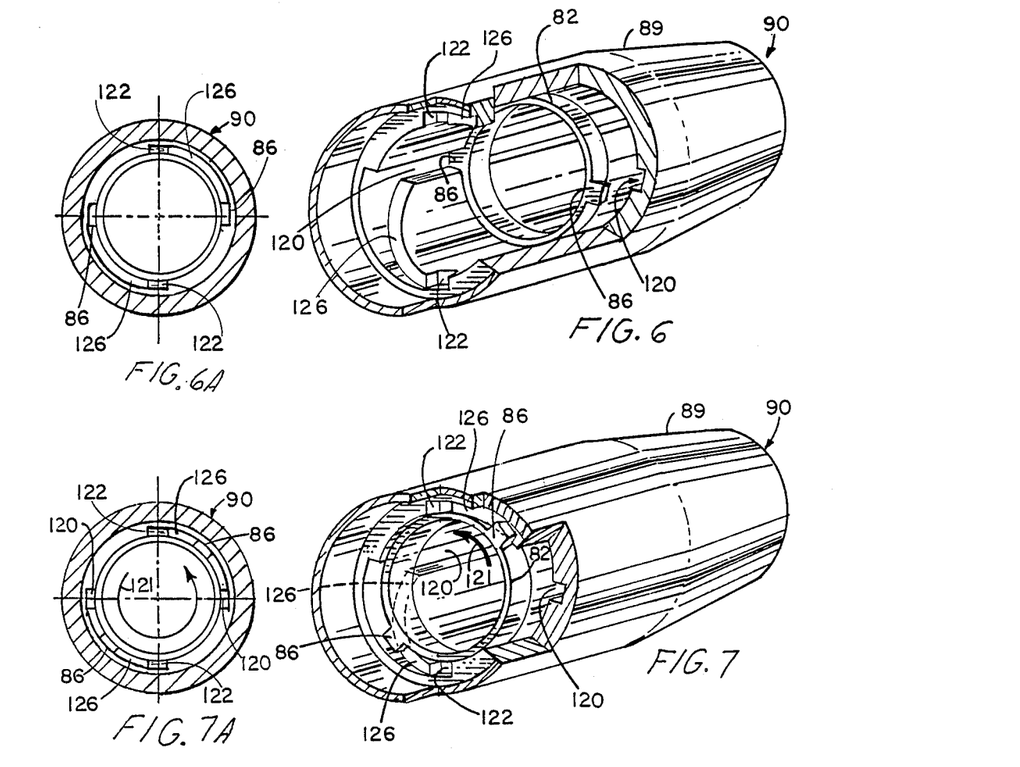
FIG. 6 is a diagrammatical, isometric view of the housing shown in FIG. 5 but having a part of the wall removed and having the cord strain relief device incompletely assembled thereto for showing a first step in forming the assembly.
FIG. 6A is an end view of the incomplete assembly shown in FIG. 6.
FIG. 7 is a diagrammatical, isometric view of the housing shown in FIG. 6 but having the cord strain relief device further assembled thereto for showing a second step in forming the assembly.
FIG. 7A is an end view of the assembly shown in FIG. 7.
Figures 8, 8A:
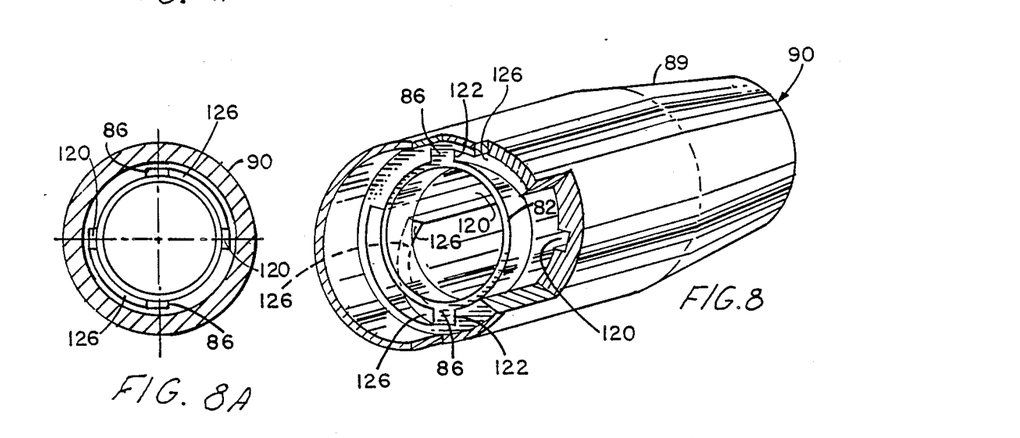
FIG. 8 is a diagrammatical, isometric view of the housing shown in FIG. 7 but having the cord strain relief device completely assembled thereto for showing a third step in forming the assembly.
FIG. 8A is an end view of the assembly shown in FIG. 8.

The cord strain relief device 20 shown in describing connection with FIGS. 1, 1A, 1B, 2 and 3A is inserted into the housing 90 through rearward portion 95 and such insertion is described in connection with FIGS. 5, 6, 7 and 8. FIG. 6 shows the ring 82 being inserted from the rearward portion 95 of the housing 90 (i.e., into aperture 130, FIG. 4) and moved towards the forward portion 91 (FIG. 4) of the housing 90. It is noted that the ears 86 are inserted into the receiving slots 120 formed within the housing 90, such ears being shown engaged in such receiving slots 120 in FIGS. 6 and 6A. After the ears 86 have passed to their most forward position within the receiving slots 120, as shown in FIG. 5 and 5A, the bushing 24 is urged forward with the outer regions thereof proximate bosses 46 squeezed together so that the bosses 46 slip into the slot formed by the constant diameter annular section 137, as shown in FIG. 5C. More particularly, since the distance between the blunt rim portions 50 (FIGS. 1 and 2) of the diametrically opposed bosses 46 is less than the larger, more rearward, diameter of the entrance aperture 130, but less than the smaller, more inner, diameter of such tapered entrance aperture 130, the forward and rearward walls of the slot formed by annular section 137 restrain the axial movement of the bushing 24 within housing 90. Further, the diameter of the annular section 137 is slightly larger than the distance between the blunt rim portions 50 (FIGS. 1 and 2) of the diametrically opposed bosses 46. Thus the size of annular section 137 and the bosses 46 are such that while the inserting of the bosses 46 into the annular section 137 prevents the bushing 24 from axial disengagement from the housing 90, the bushing 24 is free to rotate axially relative to the housing 90. Once the ears 86 are so engaged, (i.e., in their more forward position in receiving slots 120, as shown in FIG. 5, and with the bosses 46 disposed within the slots formed by annular section 137 and the pawls 54 resting on ratchet teeth 134 as shown in FIG. 5A) the bushing 24 is axially rotated with respect to the housing 90 in a direction indicated by the arrow 121 in FIGS. 5A and 7. (It is noted in FIG. 5B that the ratchet action of the teeth 134 and pawls 54 allow rotation in the direction of the arrow 121). The ears 82 thus engage the surfaces of the camming ramps 126 (FIG. 7A) which thereby urge the ears 86 into a more forward position as they are so rotated, and are thus moved towards the openings of the locking slots 122, as shown in FIGS. 7 and 7A. Once such ears 86 are positioned over the openings of locking slots 122, as shown in FIGS. 8 and 8A, the ears 86 snap backwards and into the locking slots 122 because of the axial spring action of the helical spring-like element 80 (FIGS. 1 and 3). Hence the distal end of the helical spring-like element 80 (i.e., ring 82) is prevented from axial rotation within the housing 90. However, the bushing 24 and strain relief component 22 are free to rotate about the longitudinal axis of the component. It is noted, and as will be described, that when the bushing 24 and strain relief component 22, portions of device 20 are axially rotated with respect to the housing 90 since the ring 82 of the electrical cord clamping component 26 is prevented from axial rotation relative to the housing 90, this axial rotation by the bushing 24 will reduce the diameter of the region circumscribed by the turns of the helical spring-like section 80. Further, the bushing 24 and strain relief component 22 will be fixed within the housing 90 at their rotated position by the engagement of the pawls 54 with the teeth 134 of the ratchet section until released by depression of tangs 60 in a manner to be described.

For example, referring now again to FIG. 9, the component 20 is shown with an electrical cord 35 passing therethrough and with the end of the cord electrically connected to the connector insert 99. The position of pawls 54 with respect to the ratchet teeth 134 is shown in FIG. 9A at this time. After the electrical cord 35 is connected to the electrical terminals 112 of connector insert 99, the cord 35 is pulled towards the right in FIG. 9 so that the connector insert 99 is disposed within the compartments 96, 97, 98 (FIG. 4) of the housing 90. After the connector insert 99 is fastened within the housing 90, as described above. It is noted that the helical spring-like section 80 is in a relaxed state and, having an inner diameter greater than the outer diameter of cord 35, is disengaged from the outer portions of cord 35, as shown in FIG. 11A. The bushing 24 is next manually turned (i.e., axially rotated) in the direction of the arrow 150 shown in FIG. 10 relative to the housing 90 and as a result, the bore 84 (FIG. 3) defined by the inner surface of the helical spring-like section 80 decreases and such section 80 thereby tightens around the outer portion of the electrical cord 35 as shown in FIG. 11B. It is also noted that as the bushing 24 is rotated in the direction indicated by arrow 150 in FIG. 11C (i.e. the counterclockwise direction) the pawls 54 click into slots between adjacent teeth 134 because of the resiliency of the tabs 60 and the camming action between the sloping surfaces 151 of the teeth 134 and the beveled edges 68 (FIG. 2) of the pawls 54. It is noted that while the helical spring-like section 80 becomes radially compressed by the counterclockwise (in FIG. 11C), rotation of bushing 24 clockwise (FIG. 11C) axial rotation forces are produced on the pawls 54. However, the engagement of the generally axial walls 153 of teeth 134 and the radial surface 72 (FIG. 2) of the pawls 54 prevent any clockwise (FIG. 11C) rotation of bushing 24. Thus, the bushing 24 may be incrementally manually rotated (clockwise in FIG. 11C) as shown in FIG. 10 with ratchet action allowing compressive forces of the helical spring-like section 80 to increase tighter and tighter about a portion of the outer portion of cord 35, as shown in FIG. 11B. After the bushing 24 is axially rotated to the point of the desired compression placed on outer surface of a portion of the electrical cord 35, it is noted that the bushing 24 will be locked in this angularly rotated position relative to the fixed housing 90 by the engagement of the pawls 54 against the teeth 134, as shown in FIG. 11C. In this locked engagement, the cord plug is formed; the compression of the helical spring-like section 80 is sufficient to mechanically prevent a lateral pull on cord 35 from ripping apart the electrical connection between the electrical conductors of cord 35 and terminals 122; and, also proper strain relief is provided by strain relief section 33.

Figure 12:
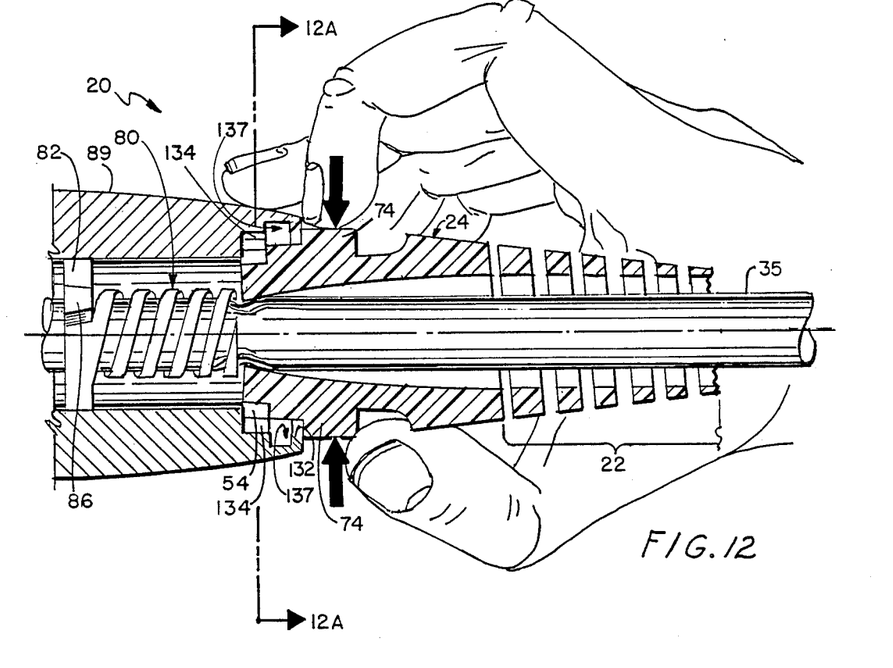
FIG. 12 is a schematic view of the connector shell and strain relief device assembly shown in FIG. 11 being operated to unclamp the electrical cord.
Figure 12A:
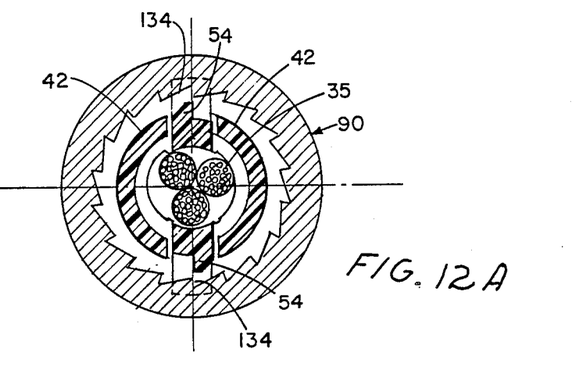
FIG. 12A is a transverse sectional view taken along line 12A—12A shown in FIG. 12 and looking into the direction of the arrows.

Having thus formed the electrical connector 130 (FIG. 11B) it may be desirable to remove the connector insert 99 from the electrical cord 35. When such removal is desired, the opposing knobs 74 of tangs 60 are manually engaged by the human fingers as shown in FIG. 12 thereby depressing the tangs 60, as shown in FIGS. 12 and 12A by the thumb and index finger and (as shown in phantom in FIG. 2) and thereby disengaging the pawls 54 from the engaged teeth 134. In this condition, the energy stored within the helical spring-like section 80 from its wrapped state allows the bushing 24 to turn relative to the housing 90. That is, the pawls 54 are disengaged from the ratchet teeth 134 and permit the user, aided by the resiliency in the wound turns of the helical spring-like element 80 to rotate the bushing component 24 in the opposing or unwinding (i.e., clockwise direction in FIG. 12A). As a result, the helical turns of the helical spring-like element 80 loosen around the encircled portion of the electrical cord 35 (as shown in FIG. 11D) to thereby permit the cord 35 from being withdrawn axially from the housing. A screw driver is inserted into the hole 105 (FIG. 1) formed in the housing 90 and the screw 107 in the connector insert 99 is again driven into the connector insert 99 thereby relieving its frictional engagement with the inner walls of housing 90. The connector insert 99 can then be pushed out of the compartments 96, 97, 98 of the housing 90 and the electrical cord 35 can be electrically disconnected from the terminals 112 of the connector insert 99.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. An electrical connector comprising:
   (a) a housing having therein: compartment means disposed adjacent a forward end of the housing for receiving an electrical device, and an array of ratchet teeth disposed circumferentially about an inner wall portion of the housing located rearwardly of said forward end; and
   (b) a member having at one end thereof a cord clamping component integrally joined through an intermediate bushing component to a cord strain relief component disposed at the other end of said member, said cord clamping component being disposed within the housing and having integral clamping means disposed for operation in response to movement of said bushing component, said bushing component having integral locking means including a pawl disposed within the housing for ratchet engagement with the array of ratchet teeth, said bushing component also having integral resilient releasing means provided on a portion of said bushing component extended externally of said housing and integrally connected to said pawl for disengaging said locking means and releasing said clamping means.

2. The electrical connector recited in claim 1 wherein said integral clamping means of the cord clamping component comprises a helical spring-like element having a distal end rotatably fixed relative to the housing and having a proximal end integrally joined to said bushing component for rotation therewith relative to the housing.

3. The electrical connector recited in claim 2 wherein said rotation of the bushing component relative to the housing winds the helical spring-like element into a tightened condition about an electrical cord passing therethrough, said spring-like element being locked into said tightened condition by rotatably positioning the pawl along the array of ratchet teeth.

4. The electrical connector recited in claim 3 wherein the distal end of the helical spring-like element terminates in a ring provided with anti-rotation means.

5. The electrical connector recited in claim 4 wherein the anti-rotation means comprises an ear extending from the ring and disposed in a slot formed in an inner wall portion of the housing.

6. An electrical connector comprising;
   (a) a housing; and
   (b) a member having a cord clamping component integrally joined through a bushing component to a cord strain relief component, said cord clamping component being disposed within the housing and said cord strain relief component being disposed externally of the housing, said bushing component having a portion within the housing provided with locking means for holding the cord clamping component in a clamping condition, and said bushing component having a portion extended externally of the housing and provided with resilient release means integrally joined to the locking means for disengaging the locking means and releasing the cord clamping component.

7. The electrical connector recited in claim 6 wherein the cord clamping component comprises a helical spring-like element having one end rotatably fixed relative to the housing and the opposing end rotatably sopported within the housing.

8. The electrical connector recited in claim 7 wherein the lacking means and a portion of the inner wall of the housing provide a ratchet and said cord release means comprises a manually operable resilient release mechanism for the ratchet.

9. An electrical connector comprising:
(a) a housing having therein: compartment means disposed within a forward portion of the housing for receiving an electrical device, an array of ratchet teeth disposed circumferentially about a first inner wall portion of the housing located rearwardly of the forward portion, and a second inner wall portion of the housing between the array of ratchet teeth and a rear entrance aperture of the housing having formed therein a circumferential groove; and
(b) a member having: a cord clamping component integrally connected to a strain relief component through a bushing component having an integral portion rotatably mounted in said groove, said bushing component having integral locking means including a pawl within the housing engageable with said array of ratchet teeth for holding the cord clamping component in a clamping condition and having integral resilient releasing means extended through said rear entrance aperture for disengaging the locking means, said cord clamping component being disposed within the housing and having:
  (i) a distal end rotatably fixed relative to the housing,
  (ii) a proximal end connected to said portion of the bushing component rotatably mounted in the groove and rotatable with the bushing component, and
  (iii) a helical spring-like element disposed between the distal end and the proximal end for providing clamping forces to portions of an electrical cord electrically connected to the electrical device and passed through the member to exit from the strain relief component thereof.

* * * * *